(12) United States Patent
Kuttner et al.

(10) Patent No.: US 11,605,101 B1
(45) Date of Patent: Mar. 14, 2023

(54) COLLABORATIVE FILTERING SYSTEM, METHOD, AND COMPUTER PROGRAM PROVIDING A MODEL USED TO CALCULATE RANKED PREDICTIONS FOR SUBSCRIBERS

(71) Applicant: Amdocs Development Limited, Limassol (CY)

(72) Inventors: Yosef Yehuda Kuttner, Petach Tikva (IL); Moshe Yechiel Shtein, Hod Hasharon (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 22 days.

(21) Appl. No.: 16/835,022

(22) Filed: Mar. 30, 2020

(51) Int. Cl.
  G06Q 30/02    (2012.01)
  G06Q 30/0201  (2023.01)
  G06Q 30/0207  (2023.01)
  G06Q 30/0211  (2023.01)

(52) U.S. Cl.
  CPC ..... G06Q 30/0206 (2013.01); G06Q 30/0211 (2013.01); G06Q 30/0212 (2013.01)

(58) Field of Classification Search
  None
  See application file for complete search history.

(56) References Cited

U.S. PATENT DOCUMENTS

| 7,370,004 B1 | 5/2008 | Patel et al. |
| 8,661,403 B2 | 2/2014 | Sullivan et al. |
| 2008/0114733 A1 * | 5/2008 | Friesenhahn ....... G06F 16/2228 |
| 2009/0177540 A1 * | 7/2009 | Quatse ................... G06Q 30/02 705/14.26 |

(Continued)

FOREIGN PATENT DOCUMENTS

| CN | 108154380 A | 6/2018 | |
| EP | 2584496 A1 * | 4/2013 | ........... G06K 9/6218 |
| WO | WO-2015038318 A1 * | 3/2015 | ......... G06Q 30/0207 |

OTHER PUBLICATIONS

Ebrahimi, S., "SmarterDeals: A Context-aware Deal Recommendation System based on the SmarterContext Engine," Thesis, University of Victoria, 2012, 76 pages.

(Continued)

*Primary Examiner* — Michael J Sittner
(74) *Attorney, Agent, or Firm* — Zilka-Kotab, P.C.

(57) ABSTRACT

As described herein, a collaborative filtering system, method, and computer program provide a model used to calculate ranked predictions for subscribers. In use, data is received which correlates subscribers of a service provider with offers provided to the subscribers by the service provider, wherein each correlation is associated in the data with an indication of whether the offer was accepted by the subscriber. From the data, a plurality of unique correlations between subscribers and offers are determined. An implicit ranking is calculated for each unique correlation, based on the associated indication of acceptance for correlations matching the unique correlation. Input data is generated that includes each unique correlation with the implicit ranking calculated for the unique correlation. The input data is processed utilizing a collaborative filtering algorithm to generate a model configured to provide predicted implicit rankings for new correlations between subscribers and offers.

7 Claims, 5 Drawing Sheets

(56) References Cited

U.S. PATENT DOCUMENTS

| | | | |
|---|---|---|---|
| 2014/0180790 A1* | 6/2014 | Boal | G06Q 30/0251 705/14.42 |
| 2015/0051957 A1* | 2/2015 | Griebeler | G06Q 10/06395 705/7.41 |
| 2017/0061286 A1* | 3/2017 | Kumar | G06Q 30/0269 |
| 2017/0127291 A1* | 5/2017 | Kremer | G06Q 30/0201 |
| 2019/0130448 A1 | 5/2019 | Kairinos | |
| 2019/0139166 A1* | 5/2019 | Walker | G06Q 30/0207 |

OTHER PUBLICATIONS

Allison, P., "Comparing Logit and Probit Coefficients Across Groups," Sociological Methods & Research, vol. 28, No. 02, Nov. 1999, pp. 186-208.

Lee et al., Classification-based collaborative filtering using market basket data, Expert Systems with Applications, vol. 29, 2005, pp. 700-704.

\* cited by examiner

COLLABORATIVE FILTERING SYSTEM, METHOD, AND COMPUTER PROGRAM PROVIDING A MODEL USED TO CALCULATE RANKED PREDICTIONS FOR SUBSCRIBERS

FIELD OF THE INVENTION

The present invention relates to making predictions for subscribers.

BACKGROUND

In general, service providers often make predictions about their subscribers to optimize the services and/or products that are offered and/or provided to those subscribers. For example, service providers, such as telecommunication service providers providing telecommunication services to its subscribers, may predict which of those telecommunication services are likely to be subscribed to by a particular one of their subscribers and, in turn, may offer the predicted telecommunication services to the particular subscriber (either singularly or bundled with other services). To this end, service providers may base the offers that they provide to their customers on the predictions they make with regard to their subscribers.

To date, the methods used to make such predictions have been limited, thus limiting the accuracy of predictions. For example, in some implementations logistical regression algorithms have been used to create a separate model for each offer, which is then usable to calculate the probability of a particular subscriber accepting or rejecting that offer. Since in this implementation a separate model must be created for each offer, subscribers can only be independently matched to various offers. This technique does not allow for any predictions among the offers themselves, such as which of the offers the subscriber is most likely to accept.

There is thus a need for addressing these and/or other issues associated with the prior art.

SUMMARY

As described herein, a collaborative filtering system, method, and computer program provide a model used to calculate ranked predictions for subscribers. In use, data is received which correlates subscribers of a service provider with offers provided to the subscribers by the service provider, wherein each correlated subscriber and offer is associated in the data with an indication of whether the offer was accepted by the subscriber. Additionally, from the data, a plurality of unique correlations between the subscribers and the offers are determined. Further, an implicit ranking is calculated for each unique correlation, based at least in part on the associated indication of whether the offer was accepted by the subscriber for each correlated subscriber and offer in the data matching the unique correlation. Still yet, input data is generated that includes each unique correlation with the implicit ranking calculated for the unique correlation. Moreover, the input data is processed utilizing a collaborative filtering algorithm to generate a model configured to provide predicted implicit rankings for new correlations between subscribers and offers.

DETAILED DESCRIPTION

Figure 1:
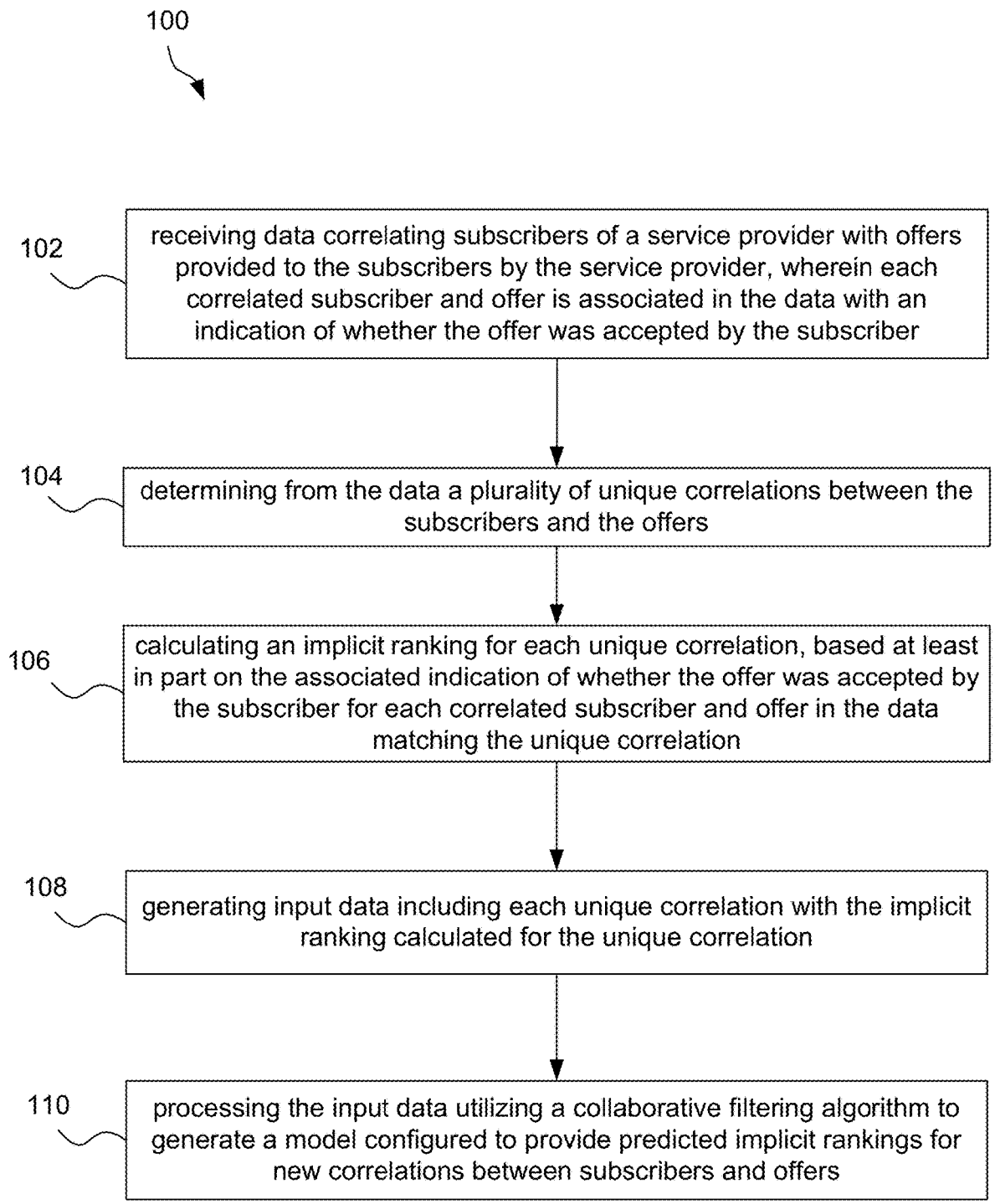
FIG. 1 illustrates a flowchart of a method for using collaborative filtering to generate a model configured to provide predicted implicit rankings for correlations between subscribers and offers, in accordance with one embodiment.

FIG. 1 illustrates a flowchart 100 of a method for using collaborative filtering to generate a model configured to provide predicted implicit rankings for correlations between subscribers and offers, in accordance with one embodiment. The method 100 may be performed by a hardware processor, computer system, or other processing system, such as those described below with reference to FIGS. 4 and/or 5.

As shown in operation 102, data is received which correlates subscribers of a service provider with offers provided to the subscribers by the service provider, wherein each correlated subscriber and offer is associated in the data with an indication (i.e. indicator) of whether the offer was accepted by the subscriber. In the context of the present description, a subscriber and offer are correlated in the data when the offer has been provided (e.g. by the service provider) to the subscriber, whether or not the subscriber accepts the offer. Thus, the data may include a separate instance of correlated subscriber/offer for each instance that an offer is provided to a subscriber. As a result, offers repeatedly provided to the same subscriber may result in multiple instances of the correlation in the data.

In the context of the present description, the service provider is any entity (e.g. company) making one or more services available for use by the subscribers. For example, the service provider may be a telecommunications service provider that makes telecommunications services (e.g. cellular, network, etc.) available to its subscribers. The subscribers may be any users of one or more services of the service provider. For example, the subscribers may be users with subscriptions to the one or more services of the service provider. Additionally, the offers may be any offerings associated with the services of the service provider. For example, the offers may be for subscribing to the services, discounts to the services, etc.

In an embodiment, the subscribers may be identified by subscriber identifiers (e.g. account numbers with the service provider). Similarly, the offers may be identified by offer identifiers (e.g. identifiers assigned to the offers by the service provider). With respect to this embodiment, the data may correlate the subscribers and offers by correlating the subscriber identifiers with the offer identifiers.

In one embodiment, the data may be received in a database. For example, a database table may correlate the subscribers and offers. As a further example, each row in the table may provide a correlation between a subscriber and an offer with the indication of whether the offer was accepted by the subscriber. In an embodiment, this may include separate fields of the row storing the subscriber identifier, the offer identifier, and the indication of whether the offer was accepted by the subscriber. Of course, it should be noted that the subscribers and offers may be correlated in the data in any manner that indicates an association between the subscribers and offers, as defined above.

In operation 104, from the data, a plurality of unique correlations between the subscribers and the offers are determined. In other words, each uniquely correlated subscriber and offer (e.g. subscriber identifier and offer identifier) are determined from the data, without regard to the indicator of whether the offer was accepted by the subscriber.

Further, in operation 106, an implicit ranking is calculated for each unique correlation, based at least in part on the associated indication of whether the offer was accepted by the subscriber for each correlated subscriber and offer in the data matching the unique correlation. In particular, for each unique correlation, all instances of a subscriber/offer correlation in the data that matches the unique correlation may be identified. Then, each indicator of acceptance in those instances may be used to calculate the implicit ranking for the unique correlation. In general, the greater the percentage of acceptance of the offer by the subscriber, the higher the implicit ranking will be for that unique subscriber/offer combination. Thus, the implicit ranking for each unique correlation between the subscribers and the offers may represent a degree to which the subscriber prefers (i.e. likes) the offer.

In an embodiment, the implicit ranking for each unique correlation between the subscribers and the offers may be further based on a number of times the subscriber was offered the offer. In another embodiment, the implicit ranking for each unique correlation between the subscribers and the offers may be further based on a number of times the subscriber accepted the offer. In yet another embodiment, the implicit ranking for each unique correlation between the subscribers and the offers may be further based on a total number of occurrences of the offer in the data (e.g. without regard to the correlated subscriber).

To this end, in one embodiment, the implicit ranking for each unique correlation between the subscribers and the offers may be calculated using an algorithm that takes as input a number of times the subscriber was offered the offer, a number of times the subscriber accepted the offer, and a total number of occurrences of the offer in the data. Table 1 illustrates one example of this algorithm:

Table 1

$$\text{implicit ranking} = \{(max+1) - inv) + resp\} * inv$$

where max is a maximum number of occurrences of the offer in the data, inv is a number of times the subscriber was provided the offer, and resp is a number of times the subscriber accepted the offer.

To this end, each unique correlation is assigned an implicit ranking. Still yet, in operation 108, input data is generated that includes each unique correlation with the implicit ranking calculated for the unique correlation. The input data may be stored in a database table, in one embodiment. For example, each row of the database table may store one of the unique correlations and the implicit ranking calculated for the unique correlation.

Moreover, in operation 110, the input data is processed utilizing a collaborative filtering algorithm to generate a model configured to provide predicted implicit rankings for new correlations between subscribers and offers. Thus, the collaborative filtering algorithm takes the input data as input and outputs the model.

In a further embodiment, the model may then be used to predict implicit rankings for new correlations between subscribers and offers. For example, another set of input data may be received for processing using the model. Then, the other set of input data may be processed using the model to provide the predicted implicit rankings for additional unique correlations between subscribers and offers included in the other set of input data. In an embodiment, the other set of input data may include a sparse table of additional correlations between subscribers and offers.

Based on the predicted implicit rankings, offers for subscribers may be selected for being provisioned to the subscribers. For example, for a subscriber in the other set of input data, one or more of the top ranked offers for that subscriber may be selected for being provided to the subscriber. To this end, multiple different offers may be ranked per subscriber, using the model, where the rankings are predicted for those offers with respect to the subscriber. Then, the rankings may be used by the service provider to select which offers are provided to the subscriber (i.e. the offer(s) predicted to be most likely to be accepted by the subscriber).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
FIG. 2 illustrates a block diagram of a method for using collaborative filtering to generate a model configured to provide predicted implicit rankings for correlations between subscribers and offers, in accordance with one embodiment.

FIG. 2 illustrates a block diagram 200 of a method for using collaborative filtering to generate a model configured to provide predicted implicit rankings for correlations between subscribers and offers, in accordance with one embodiment. The method may be carried out in the context of the flowchart 100 and related description of FIG. 1, in one embodiment. Thus, the definitions and descriptions provided above may equally apply to the present description.

As shown, data 202 is received which correlates subscribers of a service provider with offers provided to the subscribers by the service provider, as well as an indication (i.e. indicator) of whether the offer was accepted by the subscriber. In the embodiment shown, the data 202 is received as a database table. In the table, the subscribers are identified by subscriber identifiers (e.g. subscriber name) and the offers are identified by offer identifiers (e.g. offer name).

Each row of the database table provides a correlation between a subscriber and offer with the indication of whether (or when) the offer was accepted by the subscriber (i.e. the response date). In particular, in the embodiment shown, each row provides the correlation by storing in separate fields of that row the subscriber identifier, the offer identifier, and the indication of whether the offer was accepted by the subscriber. The data 202 may include multiple rows with a same correlation between subscriber/offer, such as where the subscriber was provided the same offer multiple times. The data 202 may also include multiple rows with a same subscriber correlated to different offers, such as where the subscriber was provided different offers.

As shown, implicit rankings are calculated for the unique correlations between subscribers and offers included in the data 202. The implicit rankings may be calculated according to the algorithm set forth in Table 1 above. In any case, as a result of the calculations, input data 204 is generated.

The input data 204 associates each unique correlation with the implicit ranking calculated for that unique correlation. In the embodiment shown, the input data 204 is generated in the form of a second database table. Each row of the second database table provides a different unique correlation and its associated implicit ranking.

As further shown, the input data 204 is processed utilizing a collaborative filtering algorithm to generate a model 206. The model 206 is configured to provide predicted implicit rankings for new correlations between subscribers and offers. Use of the model 206 is described below with respect to FIG. 3.

Figure 3:
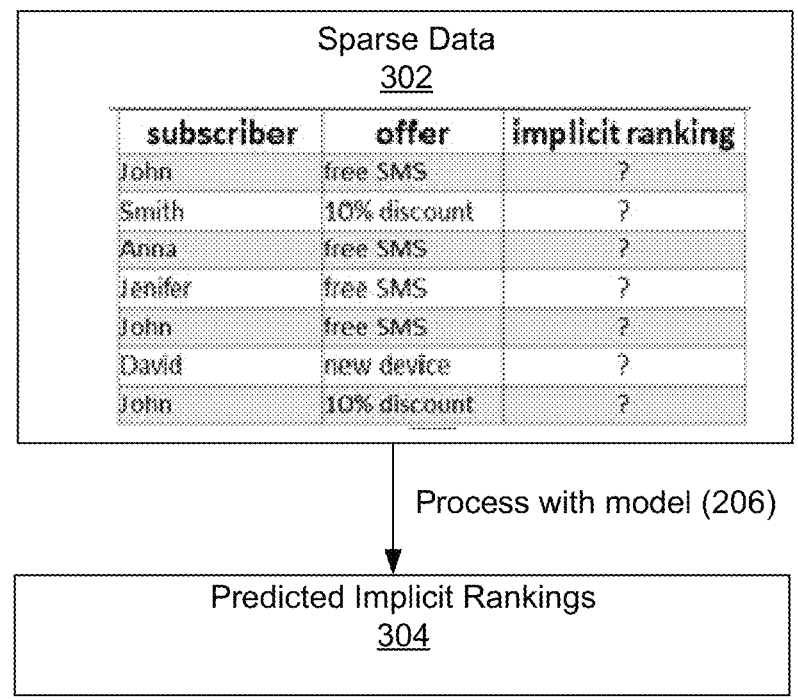
FIG. 3 illustrates a block diagram of a method for using the model of FIG. 2 to provide predicted implicit rankings for correlations between subscribers and offers, in accordance with one embodiment.

FIG. 3 illustrates a block diagram 300 of a method for using the model of FIG. 2 to provide predicted implicit rankings for correlations between subscribers and offers, in accordance with one embodiment. The method may be carried out following the generation of the model 206 in FIG. 2, in one embodiment. Thus, the definitions and descriptions provided above may equally apply to the present description.

As shown, sparse data 302 is received. The sparse data 302 correlates subscribers and offers, but does not include any implicit ranking calculated for the correlated subscribers and offers. The subscribers and offers may include different correlations of subscribers and offers than that included in the input data 204 of FIG. 2.

In the embodiment shown, the sparse data 302 is received as a database table. In the table, the subscribers are identified by subscriber identifiers (e.g. subscriber name) and the offers are identified by offer identifiers (e.g. offer name). Each row of the database table provides a correlation between a subscriber and offer. In particular, in the embodiment shown, each row provides the correlation by storing in separate fields of that row the subscriber identifier and the offer identifier.

The sparse data 302 is processed with a model configured to provide predicted implicit rankings for correlations between subscribers and offers. For example, the model may be model 206 created as described above with respect to FIG. 2. From the processing of the sparse data 302 using the model, predicted implicit rankings 304 for the correlations included in the sparse data 302 are provided. In other words, implicit rankings 304 for the correlations included in the sparse data 302 are predicted.

To this end, for a particular subscriber, the offers correlated therewith in the sparse data 302 may be ranked by predicted implicit rankings 304. One or more of the top ranked offers for the subscriber may then be provided to the subscriber. For example, a bundle of the top ranked offers may be provided to the subscriber.

Figure 4:
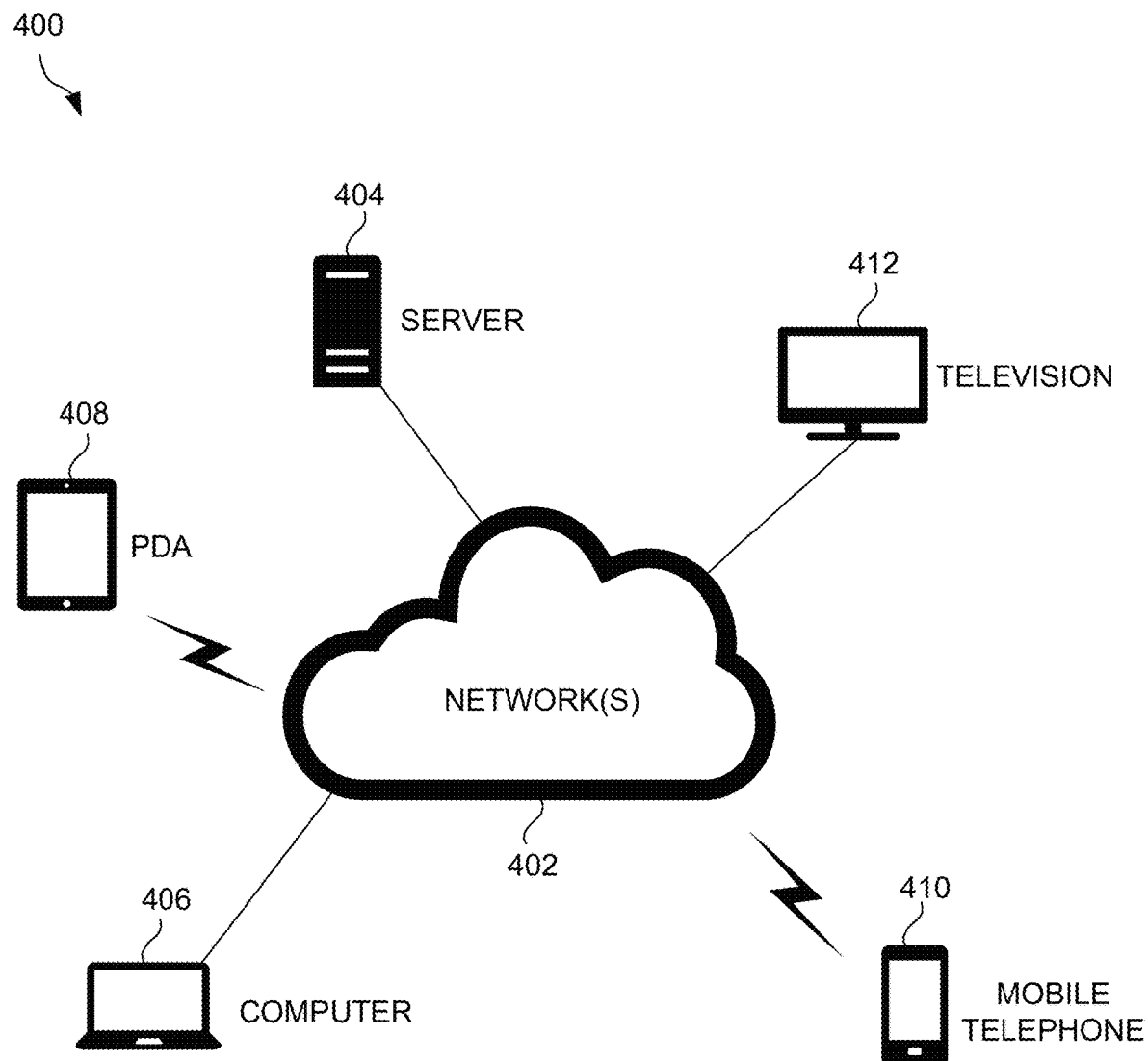
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
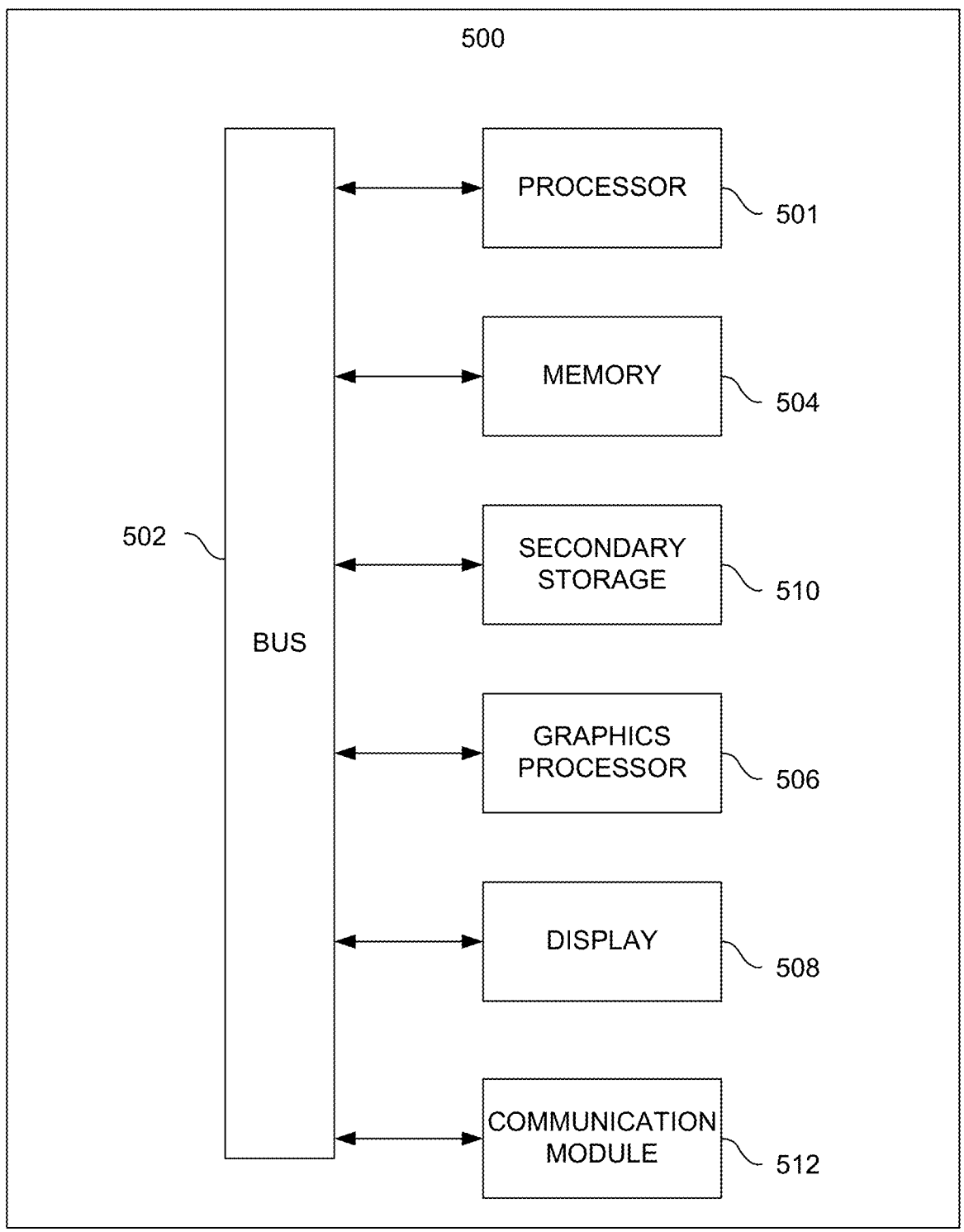
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:

receiving a first data table having rows correlating subscribers of a service provider with instances of offers provided to the subscribers by the service provider, wherein the first data table includes fields for a subscriber identifier, an offer identifier, a date of providing the offer by the service provider, and an indicator of offer acceptance by the subscribers, and where each correlated subscriber and offer in a corresponding one of the rows is also associated in the corresponding one of the rows with an indication of whether the offer was accepted by the subscriber such that:

each correlated subscriber and offer in a first subset of the rows is associated in the corresponding one of the rows with an indication that the offer was accepted by the subscriber, and each correlated subscriber and offer in a second subset of the rows is associated in the corresponding one of the rows with an indication that the offer was not accepted by the subscriber;

determining from the first data table a plurality of unique correlations between the subscribers and the offers, wherein each unique correlation is determined without regard to when the offer was provided to the subscriber and without regard to whether the offer was accepted by the subscriber;

for each unique correlation, calculating an implicit ranking for the unique correlation, the implicit ranking indicating a likelihood of acceptance of the offer in the unique correlation by the subscriber in the unique correlation, and the implicit ranking calculated as a function of:

a first count of instances of the correlated subscriber and offer in the first data table that match the unique correlation, and a second count of a subset of the instances of the correlated subscriber and offer in the first data table having an indication that the offer was accepted by the subscriber, and a third count of a maximum number of occurrences of the offer in the first data table, wherein the implicit ranking for the unique correlation is calculated using the algorithm:

$$\text{implicit ranking} = \{(\max+1)-\text{inv})+\text{resp}\}*\text{inv}$$

where
max is the third count of the maximum number of occurrences of the offer in the first data table,
inv is the first count of the instances of the correlated subscriber and offer in the first data table that match the unique correlation, and
resp is the second count of the subset of the instances of the correlated subscriber and offer in the first data table having the indication that the offer was accepted by the subscriber;

generating input data including each unique correlation with the implicit ranking calculated for the unique correlation; and processing the input data utilizing a collaborative filtering algorithm to generate a model configured to predict implicit rankings for new correlations between subscribers and offers;

receiving a sparse data table of additional correlations between subscribers and offers and without implicit rankings for the additional correlations;

processing the additional correlations using the model to predict an implicit ranking for each unique correlation of subscribers and offers in the additional correlations;

for a subscriber in the additional correlations, selecting at least one of the offers included in the additional correlations, based on the predicted implicit rankings, including:
selecting one or more of the offers included in the additional correlations having one or more top implicit rankings such that the selected one or more of the offers are those predicted to be most likely to be accepted by the subscriber in the additional correlations; and
providing the selected at least one of the offers to the subscriber.

2. The non-transitory computer readable medium of claim 1, wherein the first count of instances of the correlated subscriber and offer in the first data table that match the unique correlation represents a number of times the subscriber was offered the offer.

3. The non-transitory computer readable medium of claim 1, wherein the second count of the subset of the instances of the correlated subscriber and offer in the first data table having the indication that the offer was accepted by the subscriber represents a number of times the subscriber accepted the offer.

4. A method, comprising:
receiving a first data table having rows correlating subscribers of a service provider with instances of offers provided to the subscribers by the service provider, wherein the first data table includes fields for a subscriber identifier, an offer identifier, a date of providing the offer by the service provider, and an indicator of offer acceptance by the subscribers, and where each correlated subscriber and offer in a corresponding one of the rows is also associated in the corresponding one of the rows with an indication of whether the offer was accepted by the subscriber such that:
each correlated subscriber and offer in a first subset of the rows is associated in the corresponding one of the rows with an indication that the offer was accepted by the subscriber, and
each correlated subscriber and offer in a second subset of the rows is associated in the corresponding one of the rows with an indication that the offer was not accepted by the subscriber;

determining from the first data table a plurality of unique correlations between the subscribers and the offers, wherein each unique correlation is determined without regard to when the offer was provided to the subscriber and without regard to whether the offer was accepted by the subscriber;

for each unique correlation, calculating an implicit ranking for the unique correlation, the implicit ranking indicating a likelihood of acceptance of the offer in the unique correlation by the subscriber in the unique correlation, and the implicit ranking calculated as a function of:
a first count of instances of the correlated subscriber and offer in the first data table that match the unique correlation, and
a second count of a subset of the instances of the correlated subscriber and offer in the first data table having an indication that the offer was accepted by the subscriber, and
a third count of a maximum number of occurrences of the offer in the first data table,
wherein the implicit ranking for the unique correlation is calculated using the algorithm:

$$\text{implicit ranking} = \{(\max+1)-\text{inv})+\text{resp}\}*\text{inv}$$

where
max is the third count of the maximum number of occurrences of the offer in the first data table,
inv is the first count of the instances of the correlated subscriber and offer in the first data table that match the unique correlation, and
resp is the second count of the subset of the instances of the correlated subscriber and offer in the first data table having the indication that the offer was accepted by the subscriber;

generating input data including each unique correlation with the implicit ranking calculated for the unique correlation; and processing the input data utilizing a collaborative filtering algorithm to generate a model configured to predict implicit rankings for new correlations between subscribers and offers;

receiving a sparse data table of additional correlations between subscribers and offers and without implicit rankings for the additional correlations;

processing the additional correlations using the model to predict an implicit ranking for each unique correlation of subscribers and offers in the additional correlations;

for a subscriber in the additional correlations, selecting at least one of the offers included in the additional correlations, based on the predicted implicit rankings, including:
selecting one or more of the offers included in the additional correlations having one or more top implicit rankings such that the selected one or more of the offers are those predicted to be most likely to be accepted by the subscriber in the additional correlations; and providing the selected at least one of the offers to the subscriber.

5. The method of claim 4, wherein the first count of instances of the correlated subscriber and offer in the first data table that match the unique correlation represents a number of times the subscriber was offered the offer.

6. The method of claim 4, wherein the second count of the subset of the instances of the correlated subscriber and offer in the first data table having the indication that the offer was accepted by the subscriber represents a number of times the subscriber accepted the offer.

7. A system, comprising:

a non-transitory memory storing instructions; and one or more processors in communication with the non-transitory memory that execute the instructions to perform a method comprising:

receiving a first data table having rows correlating subscribers of a service provider with instances of offers provided to the subscribers by the service provider, wherein the first data table includes fields for a subscriber identifier, an offer identifier, a date of providing the offer by the service provider, and an indicator of offer acceptance by the subscribers, and where each correlated subscriber and offer in a corresponding one of the rows is also associated in the corresponding one of the rows with an indication of whether the offer was accepted by the subscriber such that:

each correlated subscriber and offer in a first subset of the rows is associated in the corresponding one of the rows with an indication that the offer was accepted by the subscriber, and each correlated subscriber and offer in a second subset of the rows is associated in the corresponding one of the rows with an indication that the offer was not accepted by the subscriber;

determining from the first data table a plurality of unique correlations between the subscribers and the offers, wherein each unique correlation is determined without regard to when the offer was provided to the subscriber and without regard to whether the offer was accepted by the subscriber;

for each unique correlation, calculating an implicit ranking for the unique correlation, the implicit ranking indicating a likelihood of acceptance of the offer in the unique correlation by the subscriber in the unique correlation, and the implicit ranking calculated as a function of:

a first count of instances of the correlated subscriber and offer in the first data table that match the unique correlation, and a second count of a subset of the instances of the correlated subscriber and offer in the first data table having an indication that the offer was accepted by the subscriber, and a third count of a maximum number of occurrences of the offer in the first data table, wherein the implicit ranking for the unique correlation is calculated using the algorithm:

$$\text{implicit ranking} = \{(\text{max}+1)-\text{inv})+\text{resp}\}*\text{inv}$$

where max is the third count of the maximum number of occurrences of the offer in the first data table, inv is the first count of the instances of the correlated subscriber and offer in the first data table that match the unique correlation, and resp is the second count of the subset of the instances of the correlated subscriber and offer in the first data table having the indication that the offer was accepted by the subscriber;

generating input data including each unique correlation with the implicit ranking calculated for the unique correlation; and processing the input data utilizing a collaborative filtering algorithm to generate a model configured to predict implicit rankings for new correlations between subscribers and offers;

receiving a sparse data table of additional correlations between subscribers and offers and without implicit rankings for the additional correlations;

processing the additional correlations using the model to predict an implicit ranking for each unique correlation of subscribers and offers in the additional correlations;

for a subscriber in the additional correlations, selecting at least one of the offers included in the additional correlations, based on the predicted implicit rankings, including:

selecting one or more of the offers included in the additional correlations having one or more top implicit rankings such that the selected one or more of the offers are those predicted to be most likely to be accepted by the subscriber in the additional correlations; and providing the selected at least one of the offers to the subscriber.

* * * * *